Nov. 15, 1966  W. E. LANHAM ET AL  3,285,394
CONVEYING SYSTEM
Filed April 16, 1965  4 Sheets-Sheet 1

INVENTORS
WILLIAM E. LANHAM
GENE C. MILLER
WILLIAM E. LANHAM, Jr.
BY
Curtis, Morris + Safford
ATTORNEYS

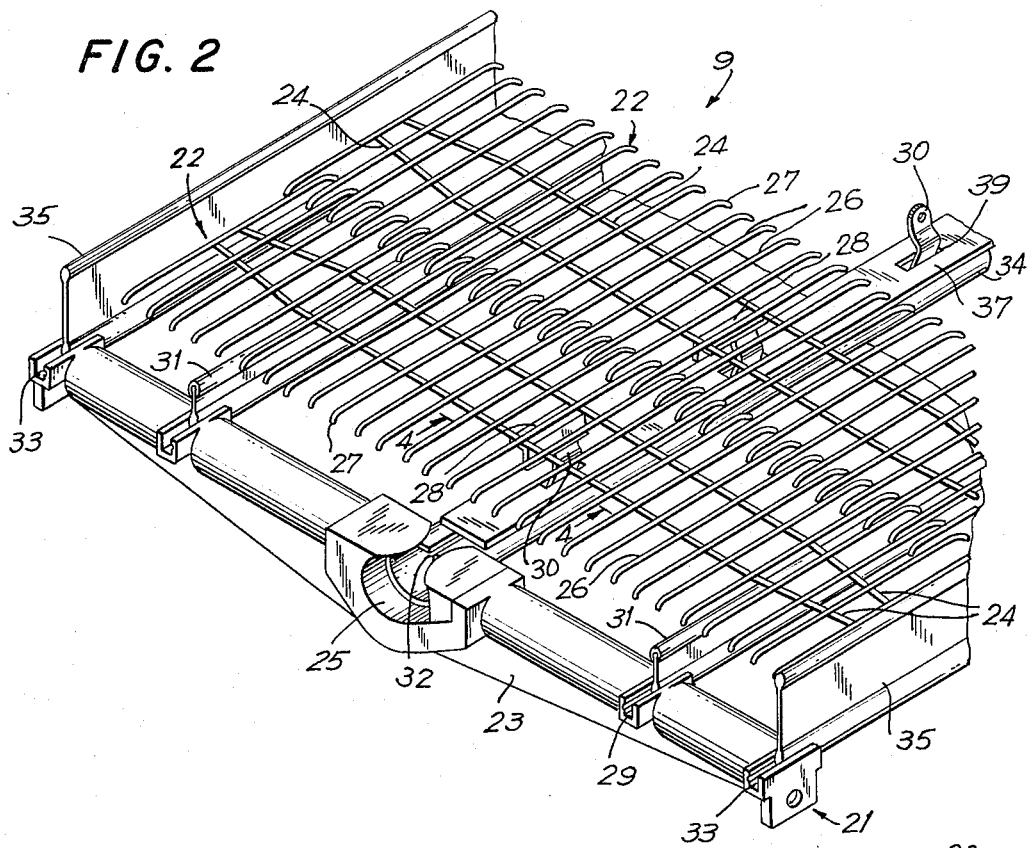

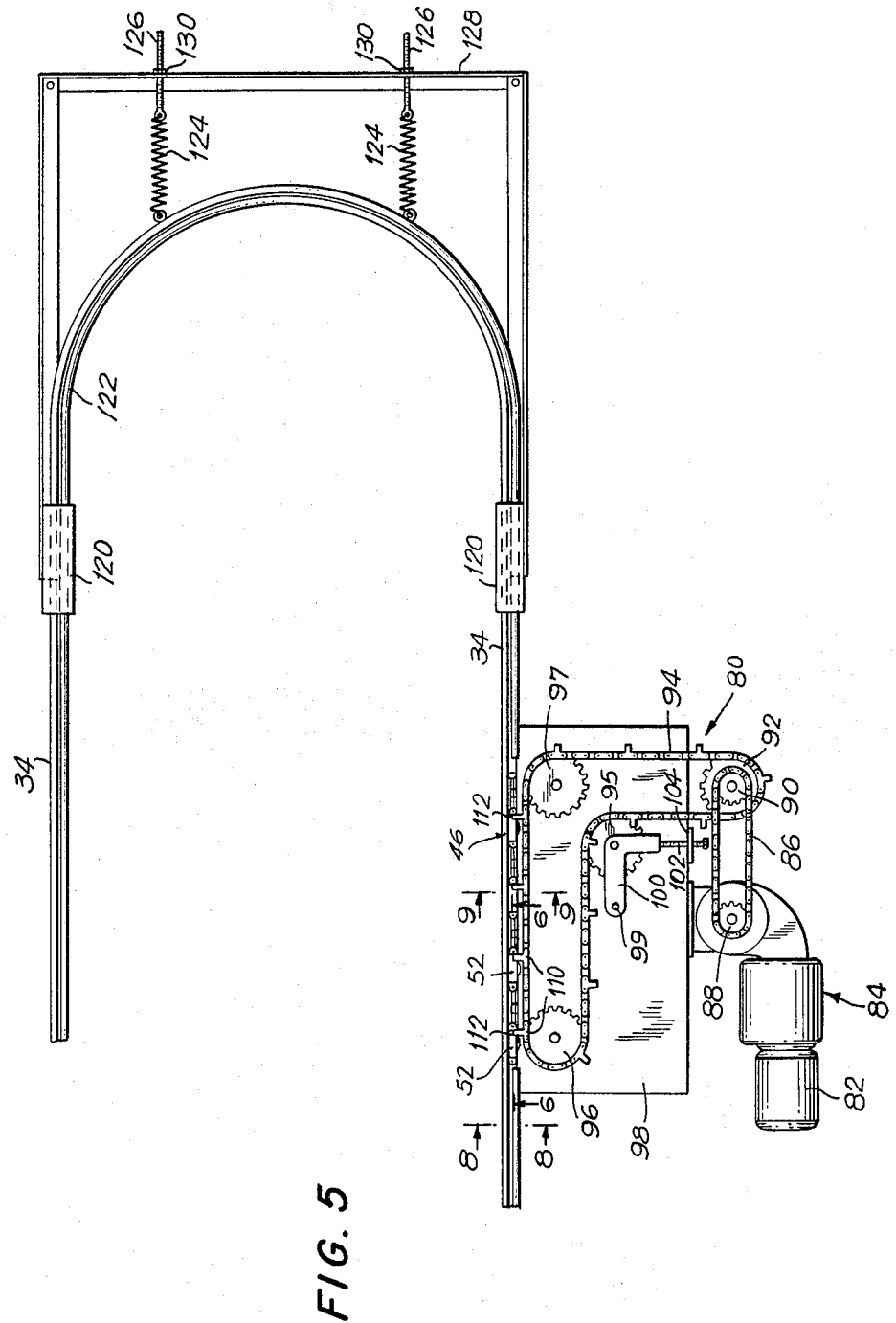

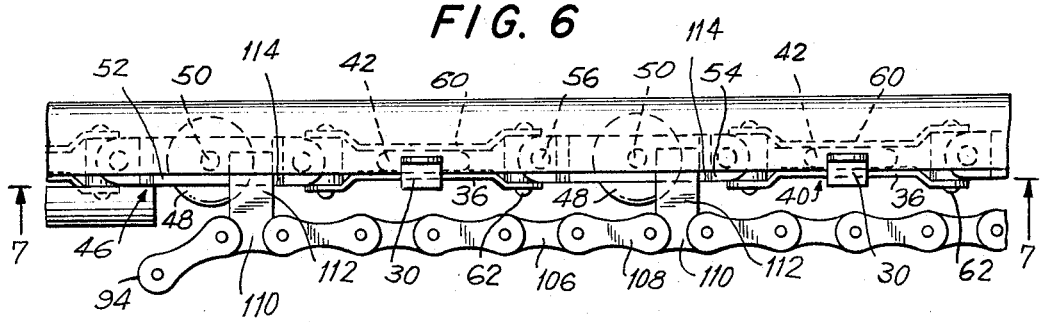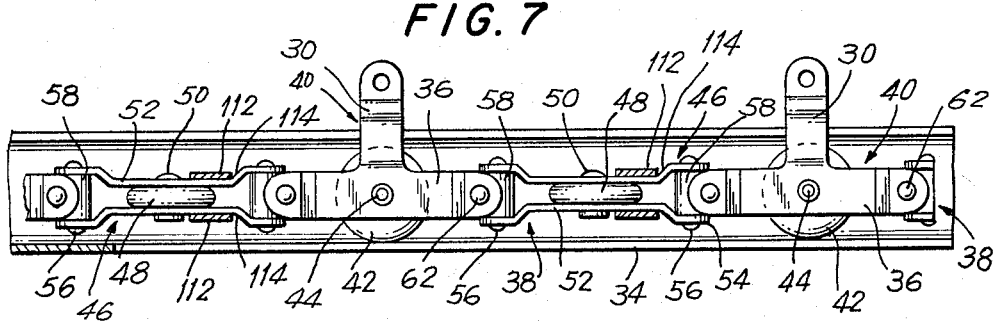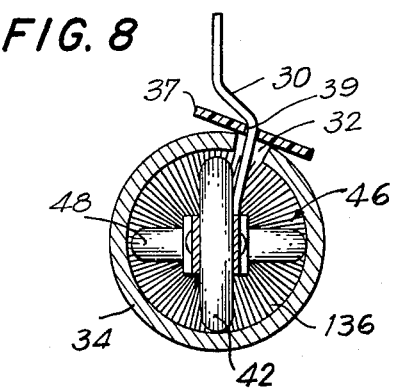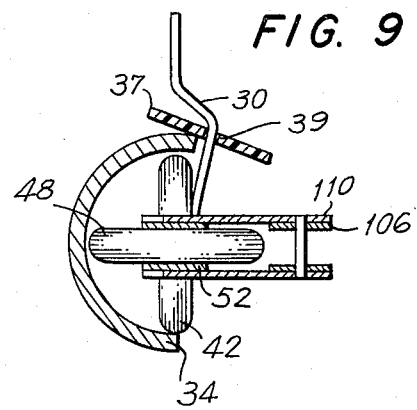

United States Patent Office 3,285,394
Patented Nov. 15, 1966

3,285,394
CONVEYING SYSTEM
William E. Lanham, 3456 Woods Drive; Gene C. Miller, 3540 Woods Drive; and William E. Lanham, Jr., 3044 Katherine Valley Road, all of Decatur, Ga.
Filed Apr. 16, 1965, Ser. No. 448,732
8 Claims. (Cl. 198—154)

This invention relates to conveying and the like, and more in particular to systems for handling bakery products, e.g., the ovens and during cooling and for delivering them for slicing when appropriate and for packaging.

An object of this invention is to provide systems for handling bakery products in a manner which avoids the difficulties which have been encountered with prior systems. A further object is to provide product conveying systems which are efficient, dependable and adaptable to meet the needs of various industries and to the many different conditions of operation and use. A still further object is to provide improved features and refinements in the systems of the above character. These and other objects will become in part obvious and in part pointed out below.

In the drawings:

FIGURE 2 is a perspective view of a portion of the conveyor system of FIGURE 1;

FIGURE 3 is a side elevation of a portion of the conveyor system of FIGURE 1;

FIGURE 4 is an enlarged sectional view on the line 4—4 of FIGURE 2;

FIGURE 5 is a horizontal plan view of one of the driving units of the system of the embodiment of FIGURE 1 and a related portion of the conveyor track;

Figure 1:
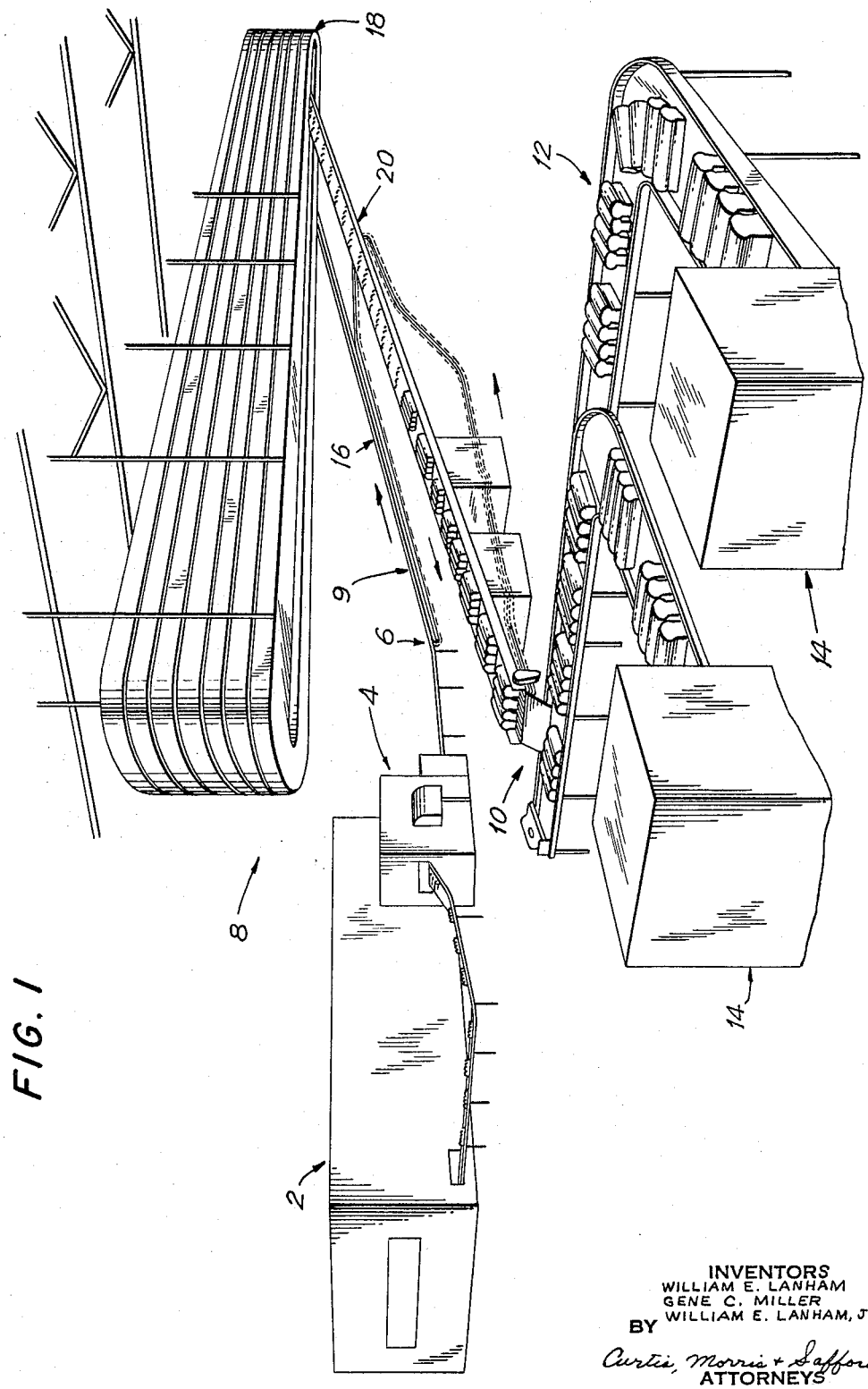
FIGURE 1 is a somewhat schematic representation of one embodiment of the invention.

FIGURES 6, 8 and 9 are sectional views respectively upon the lines 6—6, 8—8 and 9—9 of FIGURE 5; and, FIGURE 7 is a sectional view on the line 7—7 of FIGURE 6.

Referring to FIGURE 1 of the drawings, the interior of a bakery is represented somewhat schematically with ovens 2 and associated apparatus for depanning the baked products. Illustratively, standard loaves of bread are being baked and are delivered at 6 to a bread cooling and conveying system 8 which is formed by an endless conveyor 9. When passing through system 8, the bread is cooled to the desired temperature for slicing. The bread is then delivered at 10 to a distribution conveyor assembly 12 which delivers the loaves to a plurality of slicers 14 where the bread is sliced, and it is then wrapped. Conveyor 9 has a receiving run 16 which elevates the bread to the top of a multi-decked spiral conveyor 18. The bread passes around its spiral conveyor proceeding downwardly from one deck to the next until it is cooled to the desired temperature, and it is discharged along a discharge run 20.

Referring to FIGURE 2, conveyor 9 is formed by a series of product supporting racks 22 each of which comprises two transverse bars 24 and a large number of parallel bars 26 which are attached to bars 24 and upon which the products rest. The ends of bars 26 are turned downwardly at 27, and they overlap with the ends of the bars 26 of each of the next adjacent racks 22. Alternate racks 22 are offset slightly to the right and the left of the center so that the end of each bar 26 is positioned intermediate the ends of the next adjacent bars in each of the adjacent racks 22. Hence, the conveyor provides a substantially continuous support for bakery products and yet the individual racks may move individually around its bends and turns without restrictions which would be present with a continuous belt type conveyor. Each rack is individually supported by a rail assembly and a bracket 28 (see also FIGURE 4). Each bracket 28 is bolted to and supported by a vertical bracket 30 which extends through a slot 32 into a conveyor tube 34 and (see FIGURES 6 and 7) is integral with an interconnecting link 36 of an endless conveyor chain 38 which is enclosed within tube 34.

Rail assembly 21 is formed by a plurality of spaced transverse supporting brackets 23 which are supported by a frame construction (not shown). Each bracket 23 has a central slot 25 in which tube 34 is rigidly mounted, and at each side there is a slot 29 in which a nylon runner 31 is clamped, and a slot 33 in which a side plate 35 is clamped. Hence, each of the racks 22 is supported by the combined action of its bracket 28 and the two runners 31. The side plates 35 assist in guiding the products and providing protection from the side. Positioned over slot 32 is a cover 37 formed by a strip of sheet Neoprene which has rectangular openings 39 through which brackets 30 extend. As shown best in FIGURE 4, cover 37 is at an angle to the horizontal so that it tends to deflect to the side product crumbs or other materials which drop onto it. Cover 37 is flexible and moves with racks 22 and conveyor chain 38. Tube 34 is closed except at its ends and at the zones where it is driven (see FIGURES 5, 6 and 9).

Conveyor chain 38 is formed by a series of interconnected units 40 and 46 which are similar to each other. Each unit 40 has a roller 42 with a horizontal shaft 44, and each unit 46 has a roller 48 with a vertical shaft 50. Each unit 50 also has a pair of identical links 52 and at each end of the unit the ends 54 of links 52 are connected by a pivot 56, to a connector 58. Each of units 40 is similarly constructed, with its link 36 and a mating link 60 (see FIGURE 6) which is identical with links 52. Each end of each pair of links 36 and 60 is also connected by a pivot pin 62 to the adjacent connector 58 so as to provide a universal pivot connection between each end of each of the units 40 and the next adjacent units 46. The central portions of links 52 are spaced relatively close together so as to provide side plates for the roller between them, while the ends of the links are spaced apart to provide an enlarged interconnecting pivot. Links 36 and 60 are similarly constructed.

Units 40 and 46 form an endless conveyor which moves within tube 34 and can follow and turn with the contour of the tube. Rollers 42 provide vertical support and rollers 48 provide horizontal guidance. Also, each of the racks 22 is rigidly mounted upon its unit 40 so that it is moved by the conveyor chain 38 and the conveyor chain provides support.

The portion of the conveyor illustrated in FIGURE 3 is at the left-hand end of the run 20 in FIGURE 1, and tube 34 terminates and the conveyor chain 38 passes around a cog wheel 66. At the bottom of the cog wheel the endless conveyor reenters tube 34. Slot 32 (FIGURE 4) is positioned at the side of the vertical center of tube 34 so that each of the rollers 42 rests upon the wall of tube 34 (the top of tube in FIGURE 4) and provides support for its unit 40 and the attached rack 22. Hence, the racks are inverted and carried below tube 34 along the return run of the conveyor. As shown best in FIGURE 3, a tank of 70 of detergent and a tank of rinsing water 72 are positioned beneath the return run of the conveyor, and tube 34 loop downwardly above the tank so as to dip the racks successively into the detergent and the rinse water. This provides systematic cleaning of the racks at the end of the conveyor run.

Referring now to FIGURE 5, the conveyor chain is driven by a plurality of drive units 80. Each of these drive units has an electric motor 82, an adjustable speed gear reduction assembly 84, a driving chain 86 which extends between cog wheels 88 and 90, a cog wheel 92 which is fixed to cog wheel 90, a driving chain 94, and three cog wheels 95, 96 and 97 which are mounted upon a mounting plant 98. Cog wheel 95 is swingably mounted upon a pivot 99 by a pair of brackets 100, and an adjusting screw bolt 102 is provided to adjust the tension on driving chain 94. That is, bolt 102 is threaded in a bracket 104, and when it is turned clockwise it swings brackets 100 and cog wheel 95 counterclockwise about pivot 99 so as to tighten the drive chain.

Drive chain 94 is formed by center links (see FIGURE 6) 106, side links 108 and driving links 110. Each of the driving links 110 has a pair of spaced driving lugs 112 (see also FIGURE 7) which are so spaced as to project directly above and below the center portions of the two links 52. As shown at the left in FIGURES 5 and 6, when one of the driving links 110 passes around cog wheel 96 it moves in behind the leading end of a pair of the links 52, and the driving lugs 112 ride in against the shoulders 114 formed by the spaced ends of the links. Hence, the driving movement is transmitted uniformly to the conveyor chain in an efficient and dependable manner.

Driving chain 94 has the driving links spaced so that a pair of lugs 112 engage the shoulders 114 of each of the units 46 of the conveyor chain. However, the pitch of the driving chain 94 is less than the pitch of the conveyor chain 38 so that the distance between each of the pairs of lugs 112 and the next is slightly less than the distance between adjacent pairs of shoulders 114 on the links 52. As represented in FIGURE 5, when a pair of driving lugs 112 is in driving relationship with the shoulders on the pair of links 52, there are three other pairs of driving lugs projecting along the next leading pairs of shoulders 114 on links 52. However, due to the slight lesser pitch of the adjacent driving lugs 112 relative to the spacing of link (shoulders 114), the right-hand pair of driving lugs 112 is not in driving relationship with its lugs; that is, the driving lugs 112 adjacent sprocket wheel 97 are no longer assisting in driving the conveyor chain. Therefore, when the driving link moves around sprocket wheel 97 the driving lugs are withdrawn easily from the conveyor chain without causing any undesirable effect.

FIGURE 5 also shows the manner in which the conveyor is mounted at the ends of the spiral conveyor 18. The straight tubes 34 terminate in large tubes 120 and there is a U-shaped tube 122, the ends of which also telescope into the tubes 120. Tube 122 is slidably mounted on and is resiliently urged to the right by a pair of tension springs 124, each attached to tube 122 at the left and attached at the right by an adjusting bolt 126 which extends through a rigid frame member 128. The tension of springs 124 is adjusted by turning nut 130, so that by tightening nuts 130, the conveyor chain is drawn longitudinally of tubes 34 to the desired tension. As pointed out above, the vertical axis rollers 48 (see FIGURE 4) of the conveyor chain are adapted to ride upon the side walls of the tube 34 and they also ride upon the side walls of the curved tubes 122.

As shown in FIGURE 8, one of the units carries a brush 136 which continuously sweeps the inside wall of tubes 34 and 122 so as to clean out any loose materials which fall into the tubes.

We claim:

1. In a conveyor of the character described, the combination of, a frame construction, a conveyor tube assembly extending along a continuous conveying and return path from a receiving zone to a discharge zone, an endless conveyor chain extending along said path within said tube assembly, said conveyor chain comprising interconnected unit assemblies, each of which is adapted to move freely through said tube assembly and each of which has means forming driving shoulder means, said shoulder means being spaced a predetermined distance apart throughout the extent of said conveyor chain, a plurality of product supporting racks corresponding in number to said unit assemblies and mechanically connected respectively thereto, whereby each of said racks is connected to one of said unit assemblies, each of said racks presenting a horizontal product supporting area with each of said areas being substantially contiguous with those of the next adjacent racks whereby said racks form a substantially continuous conveying area, track means providing support for said racks throughout said conveying area, and driving means for said conveyor chain comprising an endless driving chain having spaced driving lugs which move into engagement with said shoulder means and means moving said driving chain along a path, a portion of which is substantially parallel with and adjacent the path of said conveyor chain, said driving lugs being spaced from each other along said driving chain at a distance slightly less than the spacing between said shoulder means on said conveyor chain.

2. Apparatus as described in claim 1 wherein each of the tubes forming said tube assembly has a slot spaced at the side of the top of the tube and a flexible cover over said slots and movable with said conveyor chain.

3. Apparatus as described in claim 1 wherein said track means comprises parallel runners extending parallel to said tube assembly and presenting supporting surfaces for said racks, and stationary side plates positioned, respectively, along the sides of said conveying area.

4. Apparatus as described in claim 1 wherein each of said unit assemblies comprises two pairs of conveyor links, with each pair being parallel and with the pairs being interconnected end to end, and a pair of rollers, one of which is mounted with a horizontal axis between one of said pairs of links, and the other of which is mounted with a vertical axis between the other of said pairs of links, said rollers being adapted to contact and ride along the inner surfaces of the tubes forming said tube assembly, each of said tubes having a longitudinal slot, and each of said unit assemblies having a bracket connecting one of said links with one of said racks and freely movable along said slots.

5. Apparatus as described in claim 1 which includes, a brush mounted upon and carried by said conveyor chain and having radially extending bristles which contact and clean the inner surface of the tubes forming said tube assembly.

6. Apparatus as described in claim 1 which includes tank means forming a rack washing zone beneath the path of the racks moving along the return path of said racks.

7. Apparatus as described in claim 1 wherein said tube assembly includes a pair of parallel tubes, a U-shaped tube having its respective ends positioned in alignment with the adjacent ends of said parallel tubes and adapted to move longitudinally thereof, and spring means urging said U-shaped tube longitudinally away from said parallel tubes whereby the conveyor chain within said parallel tubes is tightened longitudinally.

8. Apparatus as described in claim 1 wherein said driving means includes a plurality of supporting wheels for said driving chain, and adjusting means swingably mounting one of said wheels for adjusting the tension on said driving chain.

References Cited by the Examiner
UNITED STATES PATENTS 1,902,873   3/1933   Marone _____ 198—177 X EVON C. BLUNK, *Primary Examiner.*

E. A. SROKA, *Assistant Examiner.*